March 24, 1925.
M. THOMSON
1,530,704
MEANS FOR PREVENTING STATIC ELECTRICITY IN FILM CAMERAS
Filed Nov. 21, 1919
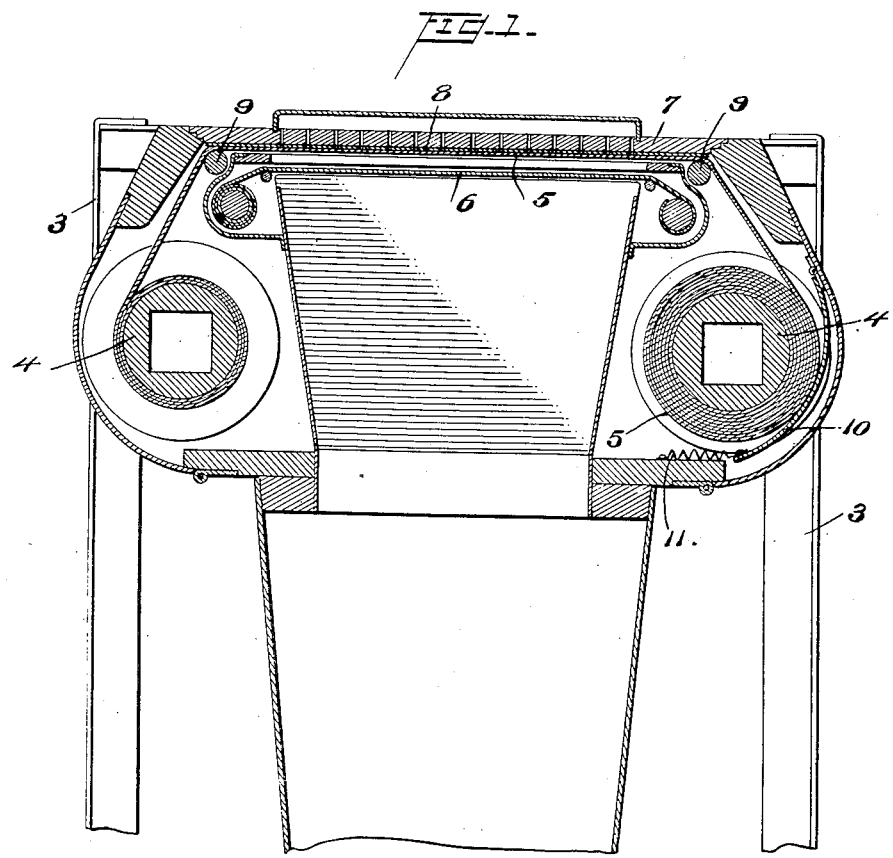
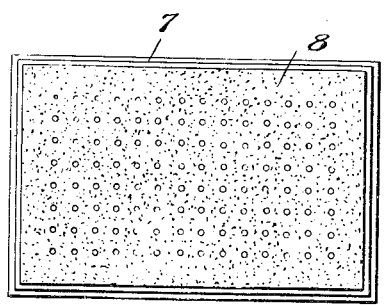
Inventor
Malcolm Thomson
By
Attorney Patented Mar. 24, 1925.

1,530,704

UNITED STATES PATENT OFFICE.

MALCOLM THOMSON, OF SWAMPSCOTT, MASSACHUSETTS.

MEANS FOR PREVENTING STATIC ELECTRICITY IN FILM CAMERAS.

Application filed November 21, 1919. Serial No. 339,724.

*To all whom it may concern:*

Be it known that I, MALCOLM THOMSON, a citizen of the United States, residing at Swampscott, in the county of Essex and State of Massachusetts, have invented certain new and useful Improvements in Means for Preventing Static Electricity in Film Cameras, of which the following is a specification.

The present invention relates to a means for neutralizing discharges of static electricity in film cameras and consists in the combinations, and arrangements of elements hereinafter described and particularly set forth in the appended claims.

Under the extreme conditions of temperature and humidity to which aerial cameras are subjected, static discharges on the film frequently occur due to the unrolling of the film and the rubbing of the film against surfaces with which it makes contact, and as a consequence of this the pictures taken are seriously injured.

The purpose of this invention is therefore to provide a means conveniently applicable to a camera which will overcome or neutralize such static charges and to obtain this result without encumbering the camera or in any way impairing its efficiency, and wherein the cost involved is nominal.

The invention is shown by way of illustration in the accompanying drawings wherein:—

Figure 1 is a central sectional view of the end of a camera showing the device applied thereto, and Figure 2 is a detailed view of the device per se.

Referring to the construction in further detail the character 3 designates the camera casing, 4 the film rolls, 5 the film, 6 the curtain shutter, and 7 the removable back of any usual type of film camera to which the device may be conveniently applied.

The device per se consists of a suitable backing 8 such as a cloth, membrane or plate that is covered or impregnated with graphite in powdered or paste like condition, placed in surface contact with the removable back portion 7 of the camera, and said graphited surface is likewise held in close surface contact with the un-exposed side of the film 6 for that portion of its travel between the guide rolls 9 in substantially the manner shown in Figure 1.

In like manner the metal shield 10 forming another backing covered with graphite is disposed in close contact with the back of the film 5 adjacent to film roll 4 and said graphited member 10 is of sufficient dimension to extend an appreciable distance to either side of the unrolling film roll 4 as shown. A spring 11 holds shield 10 in contact with the film.

The virtue of the graphite is to furnish a conducting medium or surface with an infinite number of points to allow the static charges produced by the moving film to be neutralized or discharged to atmosphere. The essential feature of the device is therefore the use of a backing of cloth or other material covered with powdered or plastic graphite placed in contact with the film at such points as static discharges are likely to occur. It is apparent that any other powder or substance having electrical conducting properties would serve the purpose as well as graphite, but graphite is deemed to be the material best adapted to the purpose and convenient for application.

It will be understood, of course, that while the invention as disclosed herein is of a specially designed construction that the invention is not limited to such structure but may on the other hand depart therefrom and employ such mechanism as may be deemed of advantage to use, within the scope of the claims.

What is claimed as new is:

1. In photographic apparatus, means for discharging static charges from a moving picture recording element, consisting of a flat backing member, treated with a carbonaceous substance adapted to contact with said element.

2. In photographic apparatus, means for discharging static charges from a moving picture recording element, consisting of a flat backing member, treated with a carbonaceous substance adapted to contact with said element over an extensive area.

3. In photographic apparatus, means for discharging static charges from a moving picture recording element, consisting of a flat backing member coated with a carbonaceous substance the entire area of said coated member being in contact with said recording element at all times.

4. In photographic apparatus, means for discharging static charges from a moving picture recording element, consisting of a flat backing member treated with graphite adapted to contact with said element on its unexposed side.

In testimony whereof I affix my signature.

MALCOLM THOMSON.